Figure 1:
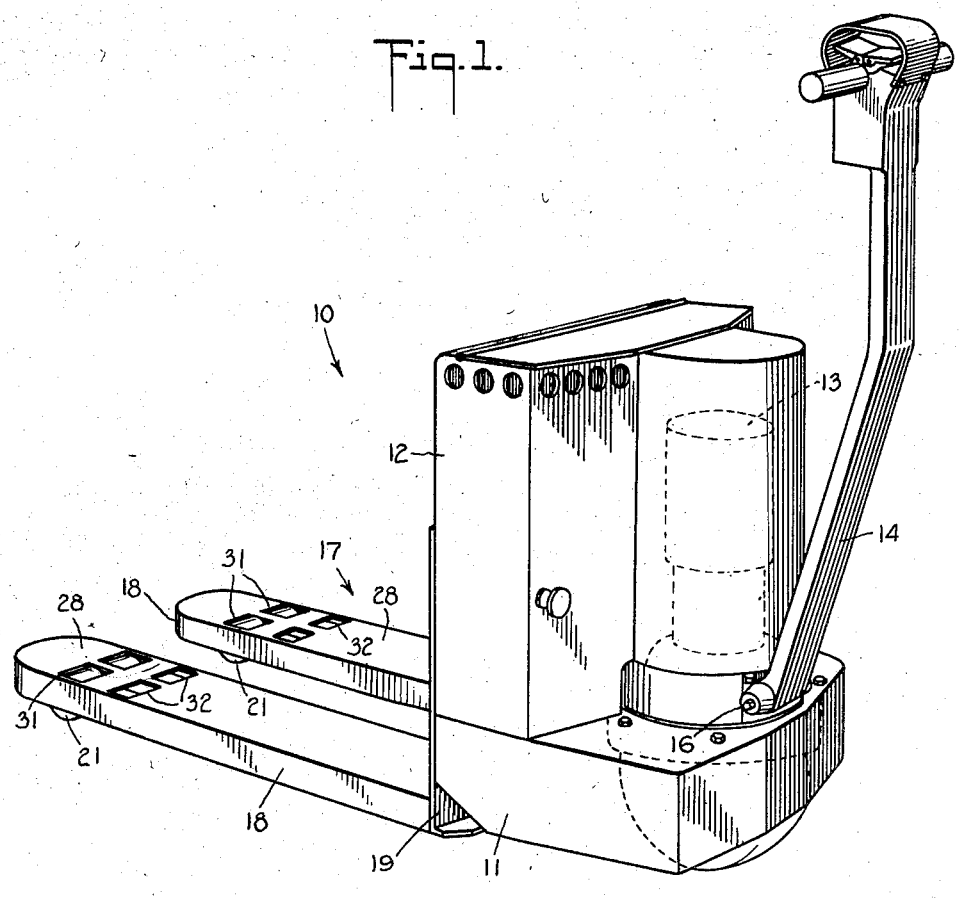

Sept. 9, 1958    B. I. ULINSKI    2,851,276
PALLET TRUCK WITH PALLET CLAMP
Filed Feb. 1, 1956    3 Sheets-Sheet 1

INVENTOR.
B. I. Ulinski,
BY
ATTORNEY

Sept. 9, 1958     B. I. ULINSKI     2,851,276
PALLET TRUCK WITH PALLET CLAMP
Filed Feb. 1, 1956     3 Sheets-Sheet 2
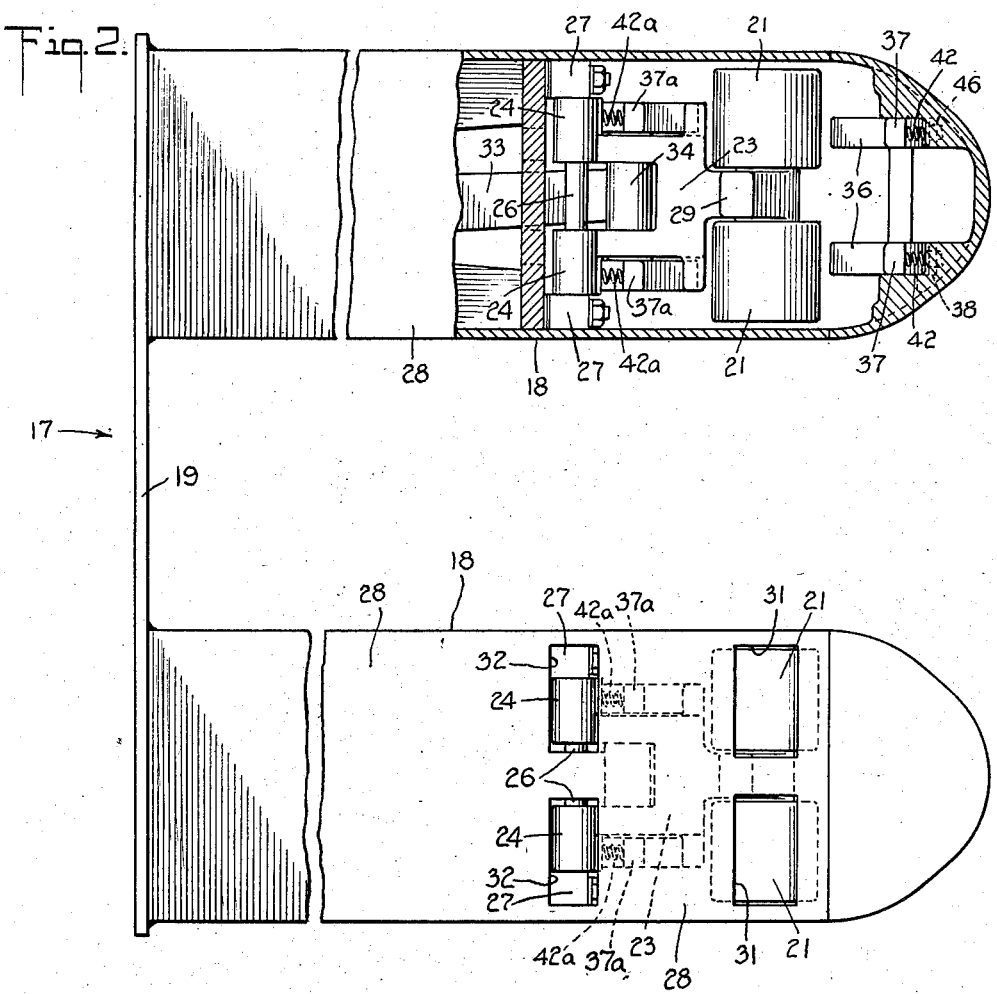
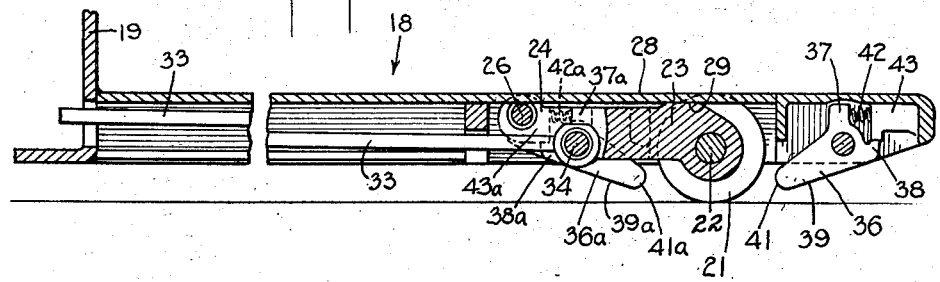
INVENTOR.
B. I. Ulinski
BY
A. H. Golden
ATTORNEY Sept. 9, 1958  B. I. ULINSKI  2,851,276
PALLET TRUCK WITH PALLET CLAMP
Filed Feb. 1, 1956  3 Sheets-Sheet 3
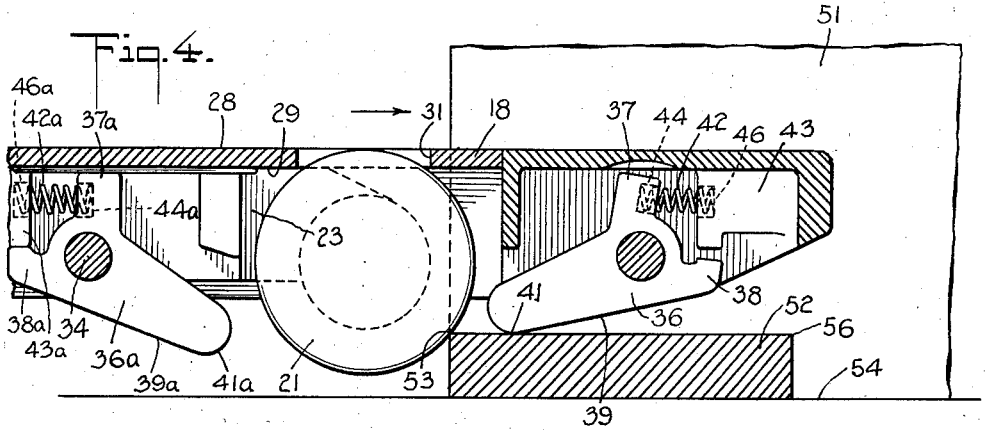
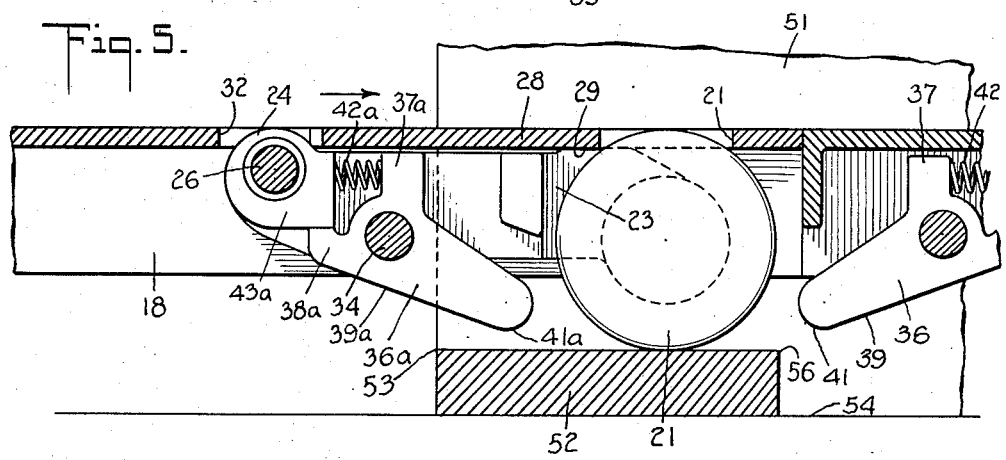
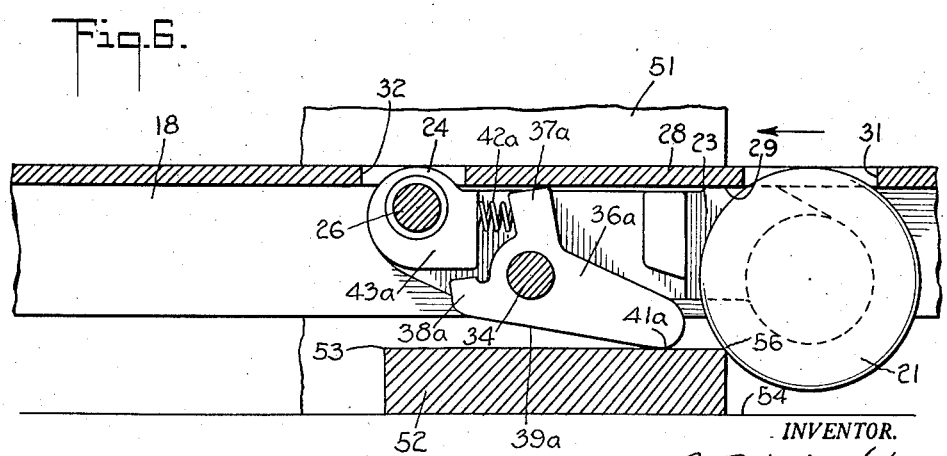
INVENTOR.
B. I. Ulinski
BY
A. H. Golden
ATTORNEY

# United States Patent Office 2,851,276
Patented Sept. 9, 1958

2,851,276

PALLET TRUCK WITH PALLET CLAMP

Bronislaus I. Ulinski, Flossmoor, Ill., assignor to The Yale & Towne Manufacturing Company, Stamford, Conn., a corporation of Connecticut Application February 1, 1956, Serial No. 562,708

3 Claims. (Cl. 280—5.2)

This invention relates to industrial trucks, and more particularly to industrial trucks of the type known as pallet trucks.

Pallet trucks have exceedingly low load lifting platforms adapted to enter between the upper and lower floors of standard commercial pallets. The pallets are equipped with spaced lower floor boards and the truck has small load wheels that must enter the pallet and move into one of the several spaces provided between the lower floor boards. Thereafter, the wheels are moved downwardly relatively to the truck so as to elevate the truck platform and the pallet, the wheels remaining on the floor, and the links on which the wheels are mounted extending downwardly through the spaces between the floor boards. A truck of the particular class is well illustrated in the patent to Quayle 2,274,164 assigned to the Yale & Towne Manufacturing Company, to which this application is assigned.

It has long been recognized that small load wheels of the type that must be used on pallet trucks encounter very great difficulty in entering and leaving a pallet. Thus, the load wheels, generally less than four inches in diameter, encounter great resistance when they strike a lower floor board which may be one inch in thickness. obviously, there is a considerable tendency for the wheel merely to push the pallet rather than to enter between the lower floor boards of the pallet, if there is nothing present to prevent the movement of the pallet. The same is true when the truck is to be moved outwardly of the pallet, the load wheels lying in one of the spaces between the lower floor boards. Where the pallet is empty, there will be a tendency for the wheels merely to push the pallet along the floor rather than to ride over the lower floor boards to allow the removal of the truck.

The particular problem that I have described has long confronted the art and many solutions have been proposed. In such patents as that to Quayle 2,274,164 a series of rollers are positioned at one side of the load wheel, these rollers acting to lift the truck in graduated steps to facilitate its entering into a pallet. Like rollers are utilized to assist the truck in leaving the pallet. While this construction is quite helpful and is used extensively commercially, it is not entirely satisfactory because it requires a series of rollers, and further, requires the actual lifting of the truck by the rollers as the rollers coact with the pallet.

In the Quayle Patent 2,498,504 there is another attack on the problem, Quayle there illustrating cam surfaces that act to cam the truck upwards so as to bring the load wheels toward the level of the upper surfaces of the lower floor boards of the pallet. While this construction is a considerable improvement, it still is not satisfactory because it operates on the theory of the lifting of the truck relatively to the pallet. Other inventors have attacked the problem by other means using rollers that function to lift the elevating platform. Again, there is present the basic concept of means for camming the truck upwardly to ease the movement of the load wheels into position.

The invention I have now conceived operates on the concept of holding the pallet against movement relatively to the floor so that when the small wheels strike the pallet, the pallet will remain stationary and the truck will move inwardly into position, or reversely, outwardly of the pallet. While, under this concept, there is still present a relatively hard action between the load wheels and the pallet, it is nevertheless possible to move the load wheels into position even though the pallet is empty, since the pallet will be held stationary to allow the truck to be manipulated.

Furthermore, through the arrangement I have conceived, the means that effect the holding of the pallet against movement on the floor, operate with great facility so that there is little or no tendency to move the pallet relatively to the floor incidental to the initial operation of the truck relatively to the pallet. Thus, whereas in prior art structures there is a tendency for the rollers and cams to move the pallet even while attempting to lift the truck relatively to the pallet, in my construction there is no such tendency to move the pallet.

As a feature of my invention I use pivoting dogs that yield very readily upon contact with the pallet floor, so as to allow the movement of the truck relatively to the pallet to bring the dogs in a position resting against the upper surfaces of the lower floor boards. The downward pressure of the dogs against the lower floor boards is then effective to create very considerable friction between these floor boards and the floor or ground on which the pallet is resting. This relationship between the ground or floor and the pallet is such as to create considerable resistance to the movement of the pallet so that the pallet remains in place when the load wheels of the truck strike the lower floor boards of the pallet.

As a particular feature of my invention, I utilize dogs at each side of the load wheels of my pallet truck, and certain of these dogs are mounted for movement on the links or levers on which the load wheels of the truck are themselves mounted. This is an important feature of my invention since trucks of the particular class have very little space available for the mounting of operating structure. By conceiving the mounting of the dogs on the levers I make possible the utilization of the dogs while not enlarging the entire operating combination.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the accompanying drawings, which illustrate one preferred embodiment of this invention, Fig. 1 is a perspective view showing the pallet truck. Fig. 2 is a plan view, with portions in section, of the lifting platform of the truck. Fig. 3 is a cross-sectional view in elevation, taken through the middle of one of the platform legs. Figs. 4, 5, and 6 are elevations in cross-section of portions of a platform leg and portions of a pallet, and illustrate the manner of interaction of the dogs, load wheels and pallet.

Referring now more particularly to the drawings and specifically Fig. 1, reference numeral 10 indicates generally a truck having a lifting head 11 on which is mounted a casing 12 carrying a battery (not shown) furnishing the power for actuating the truck. As is usual in the art, a traction unit 13 is pivoted to the lifting head 11 for movement about a vertical axis, and this traction unit carries a motor driven by the battery, a ground-engaging traction wheel, a transmission for connecting the motor and the wheel, and a steering handle 14, the latter being pivoted to the traction unit 13 at 16. This construction, being conventional, is shown only in a diagrammatic manner.

The elevating platform of the truck is designated generally by reference numeral 17 and, as is common in the art, is formed of a pair of horizontally extending legs 18, the legs being secured, as by welding, at their forward ends to the forward standard 19 of the elevating platform. At the rear end of each leg 18 there is disposed a pair of load wheels 21 which are of small diameter, often less than 3 inches. The axles 22 (Fig. 3) of the pairs of load wheels 21 are mounted on levers or links 23 which are pivoted to the legs 18, spaced ears 24 on said links being journalled on pins 26 supported on blocks 27 (Fig. 2) fixed to sides of the legs 18. Normally, the links 23 are in the retracted position shown in the drawings, with the top plates 28 of the legs 18 resting on shoulders 29 formed on the links 23 and with the upper portions of the load wheels 21 projecting into suitable apertures 31 in said top plates. The top plates 28 are also apertured at 32 to receive the upper portions of the ears 24 of the links 23.

The links 23 and load wheels 21 can be swung downwardly to lift the rear ends of the legs 18 by means of tension rods 33 (Fig. 3) which are pivoted to said links at 34 and which extend through said legs to the forward end of the truck 10. These tension rods 33 may be operated, in conventional manner, in conjunction with the usual means for lifting the forward ends of the legs 18, all as those skilled in the art fully understand.

Mounted rearwardly of the wheels 21 and pivoted to the legs 18 are dogs 36 having, in the construction shown in the drawing (see Figs. 3 and 4) upwardly projecting arms 37, horizontally projecting shoulders 38, and lower cam surfaces 39 terminating in rounded ends 41. The ends 41 of the dogs 36 are urged downwardly by the action of compression springs 42 disposed between the arms 37 and abutments 43 formed on the legs 18, the downward movements of the ends 41 being limited by the engagement of the shoulders 38 with said abutments. In order to keep the springs 42 in place, the arms 37 and abutments 43 are formed with pockets 44 and 46, respectively, for receiving the ends of said springs.

Disposed forwardly of the load wheels 21 are second sets of dogs 36a. These forward dogs 36a are preferably pivoted on the pins 34 through which the tension rods 33 are joined to the links 23. In all other respects dogs 36a are identical in construction with the rear dogs 36. Thus, these forward dogs 36a have upwardly projecting arms 37a, horizontally disposed shoulders 38a, straight lower surfaces 39a and rounded ends 41a, and their ends 41a are urged downwardly by the action of compression springs 42a disposed between the arms 37a and abutments 43a formed on the links 23. As in the case of the rear dogs 36, the downward movement of the ends 41a of the forward dogs 36a is limited by the engagement of the shoulders 38a and the abutments 43a, and the arms 37a and abutments 43a have pockets 44a and 46a, respectively, receiving the ends of the springs 42a. It will be observed that the springs 42, 42a are so arranged that the force of their compression is transmitted to the legs 18 in a substantially horizontal direction.

In operation, when the truck is driven rearwardly so that its legs 18 move under a pallet 51 such as the one shown partially in Fig. 4, having a lower floor board 52, an edge 53 of the board 52 is first engaged by the lower cam surfaces 39 of the rear dogs 36. Continued rearward movement of the truck causes the rear dogs 36 to tilt against the action of the springs 42 and brings the ends 41 of said dogs into engagement with the top of the board 52. Thus a downward pressure is exerted on the board 52. However, at this stage the legs 18 are not lifted from their original lowered position, particularly since the force of the springs 42 is transmitted to said legs in a horizontal rather than a vertical direction.

Further rearward movement of the truck brings the load wheels 21 into engagement with the edge 53 of the floor board 52. Ordinarily, if the pallet 51 were empty, this movement would cause the pallet to slide rearwardly along the floor 54. However, the downward pressure exerted through the dogs 36 increases the friction between the pallet and the floor and thus keeps the pallet stationary while the load wheels 21 ride up over the edge 53 of the board 52 as shown in Figs. 4 and 5.

When the truck is moved forwardly so as to bring the legs 18 out from under the pallet, the forward dogs 36a function in a manner identical with that described above in connection with the rear dogs 36 so that the pallet is kept in place. Fig. 6 shows the load wheel 21 riding forwardly over a rear edge 56 of the board 52 while the board is pressed downwardly against the floor 54 by the rounded ends 41a of the forward dogs 36a.

The shape and position of the dogs 36, 36a are preferably such that their lower cam surfaces 39 are disposed at a small acute angle to the horizontal, so that the dogs exert a minimum tendency to push the pallet 51 along the floor while the lower cam surfaces 39, 39a of said dogs are riding along the edges 53 or 56, respectively of the floor board 52.

It will be apparent, of course, that the dogs 36, 36a should be of such size and so positioned that the lower ends 41 or 41a will come into engagement with the tops of the floor boards 52 before the load wheels 21 engage the edges 53 or 56 respectively of said boards. By the same token, the ends 41, 41a of the dogs 36, 36a should not be spaced from the load wheels 21 a distance greater than the width of a lower floor board 52.

Having now described a preferred embodiment of my invention, I claim:

1. In a truck of the class described having load wheels of small diameter adapted to enter a pallet having a floor board, camming dogs pivoted to said truck at points in advance of the movement of said wheels, each dog having an inclined camming surface that extends from a point near the pivot of the dog downwardly toward a corresponding load wheel for contacting the floor board of the pallet in advance of said wheels, springs urging each of said dogs downward into an initial position in which each dog has its lowermost part above the surface of the floor on which said pallet is resting, said springs formed to yield through the action of the floor board in line contact with said camming surface of said dogs so that said dogs slide over the upper surface of the floor board as the truck moves on its load wheels toward the pallet, and said dogs when sliding over the upper surface of the floor board of the pallet pressing the under surface of the floor board against the floor with sufficient friction developed thereby between the floor board and floor to hold the board against sliding on the floor when the wheels strike the edge of the floor board preparatory to riding over said board.

2. In a truck of the class described having load wheels of small diameter mounted on pivoting levers in which the levers move to lower the wheels relatively to the truck and into the openings between the lower floor boards of a pallet in order to lift the truck and the pallet, a dog pivoted to each of said levers, each dog having an inclined camming surface that extends from a point near the pivot of the dog downwardly toward the corresponding load wheel and adapted to engage the upper surface of a lower floor board of said pallet in advance of the movement of said wheels, springs pressing said dogs downwardly from said truck and against said upper surface of said board, said springs formed to yield through the action of the floor board in line contact with said camming surfaces of said dogs so that said dogs slide over the upper surfaces of said board as said load wheels move toward the board, and said dogs when sliding over the upper surface of the floor board pressing the under surface of said board against the floor with friction developing thereby between said board and floor to hold said board against sliding when the load wheels strike the edge of said board preparatory to riding over said board.

3. In a truck of the class described having rearwardly disposed legs and having load wheels of small diameter mounted on pivoting levers at the rear ends of said dogs, said levers movable to lower the load wheels relatively to the legs and into an opening between the lower floor boards of a pallet in order to lift the legs and the pallet, rear dogs pivoted to said legs rearwardly of said wheels, forward dogs pivoted to said levers forwardly of said wheels, each of said rear dogs having an inclined camming surface that extends from a point near the pivot of the dog downwardly toward a corresponding load wheel for contacting a lower floor board of the pallet in advance of the movement of said wheels when said truck is moved rearwardly, each of said forward dogs having an inclined camming surface that extends from a point near the pivot of the dog downwardly toward the corresponding load wheel for contacting said lower floor board in advance of said wheels when said truck is moved forwardly, springs urging each of said dogs downward into an initial position in which each dog has its lowermost part above the surface of the floor on which said pallet is resting, said springs yielding so that said dogs move against the pressure of said springs toward said legs of the truck through the action of the floor board contacting the camming surfaces of said dogs, and said dogs then sliding in line contact with the upper surfaces of the floor board whereby to press the under surfaces of the floor board against the floor with sufficient friction developed thereby between the floor board and floor to hold the floor board against sliding on the floor when the wheels strike the edge of the floor board preparatory to riding over said floor board.

References Cited in the file of this patent

UNITED STATES PATENTS

| | | |
|---|---|---|
| 2,361,544 | Hastings | Oct. 31, 1944 |
| 2,372,585 | Klumb et al. | Mar. 27, 1945 |
| 2,498,504 | Quayle | Feb. 21, 1950 |